US010672379B1

(12) United States Patent
Ellert et al.

(10) Patent No.: US 10,672,379 B1
(45) Date of Patent: Jun. 2, 2020

(54) SYSTEMS AND METHODS FOR SELECTING A RECIPIENT DEVICE FOR COMMUNICATIONS

(71) Applicant: Amazon Technologies, Inc., Seattle, WA (US)

(72) Inventors: Rafal Ellert, Gdansk (PL); Anton Martynenko, Gdansk (PL); Tomasz Miarowski, Gdynia (PL); Michal Miotk, Gdansk (PL); Kostiantyn Nosovsky, Gdansk (PL); Krzysztof Jakubczyk, Gdansk (PL); Adam Stanski, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 15/714,767

(22) Filed: Sep. 25, 2017

(51) Int. Cl.
*G10L 15/22* (2006.01)
*G10L 15/01* (2013.01)
*G06F 3/16* (2006.01)

(52) U.S. Cl.
CPC .............. *G10L 15/01* (2013.01); *G06F 3/162* (2013.01); *G06F 3/167* (2013.01); *G10L 2015/223* (2013.01)

(58) Field of Classification Search
CPC .. G10L 15/22; G10L 2015/223; G10L 15/265
See application file for complete search history.

(56) References Cited

U.S. PATENT DOCUMENTS

| | | | | |
|---|---|---|---|---|
| 6,418,328 | B1* | 7/2002 | Shon | G10L 15/08 |
| | | | | 379/355.09 |
| 8,600,742 | B1* | 12/2013 | Gruenstein | G10L 15/08 |
| | | | | 704/231 |
| 9,009,046 | B1* | 4/2015 | Stewart | G10L 15/18 |
| | | | | 704/251 |
| 10,078,487 | B2* | 9/2018 | Gruber | G06F 3/165 |
| 10,116,748 | B2* | 10/2018 | Farmer | H04L 67/12 |
| 10,176,167 | B2* | 1/2019 | Evermann | G06F 17/279 |
| 10,199,051 | B2* | 2/2019 | Binder | G06F 3/167 |

(Continued)

OTHER PUBLICATIONS

"Suggesting Friends Using the Implicit Social Graph", Roth, et al @Google, Inc.—Israel R & D Center, pp. 1-9.

*Primary Examiner* — Jialong He
(74) *Attorney, Agent, or Firm* — Pierce Atwood LLP

(57) ABSTRACT

Systems and methods for establishing a communications system between multiple electronic devices are described herein. In some embodiments, audio data representing a first utterance may be received from a first electronic device. A user account may be associated with the electronic device, and intent data may be determined from the audio data. Based on the intent data, it may be determined that the utterance includes an intent to communicate with a contact. A list of potential contacts may then be generated. Based on the intent data, a condition may be determined. The condition may represent a particular circumstance in which the utterance was received by the first electronic device, and based on the condition, a plurality of interaction ranks may be determined. A contact name having the highest interaction rank may be determined from the plurality of contacts, and a communications session between the first electronic device and an electronic device belonging to the contact may be established.

18 Claims, 5 Drawing Sheets

(56) References Cited

U.S. PATENT DOCUMENTS

| | | | | |
|---|---|---|---|---|
| 2002/0120452 | A1* | 8/2002 | Davis | G10L 15/22 |
| | | | | 704/270 |
| 2006/0035632 | A1* | 2/2006 | Sorvari | H04M 1/271 |
| | | | | 455/418 |
| 2008/0059172 | A1* | 3/2008 | Bocking | G10L 15/26 |
| | | | | 704/235 |
| 2010/0305807 | A1* | 12/2010 | Basir | B60R 16/0373 |
| | | | | 701/31.4 |
| 2011/0184730 | A1* | 7/2011 | LeBeau | G10L 15/30 |
| | | | | 704/201 |
| 2011/0288868 | A1* | 11/2011 | Lloyd | H04M 1/271 |
| | | | | 704/251 |
| 2012/0035924 | A1* | 2/2012 | Jitkoff | G01C 21/3608 |
| | | | | 704/235 |
| 2013/0018659 | A1* | 1/2013 | Chi | G06F 1/163 |
| | | | | 704/275 |
| 2014/0201229 | A1* | 7/2014 | Kirazci | G06F 16/3323 |
| | | | | 707/767 |
| 2015/0279366 | A1* | 10/2015 | Krestnikov | H04W 4/70 |
| | | | | 704/235 |

\* cited by examiner

SYSTEMS AND METHODS FOR SELECTING A RECIPIENT DEVICE FOR COMMUNICATIONS

BACKGROUND

Electronic devices, such as audio (e.g., voice) controlled electronic devices, are capable of performing various functions. For instance, an individual may speak a command to such a device, and in response, the device may be entered into a communications session with another device. Some voice-controlled electronic devices may also include display screens capable of outputting content.

DETAILED DESCRIPTION

Figure 1A:
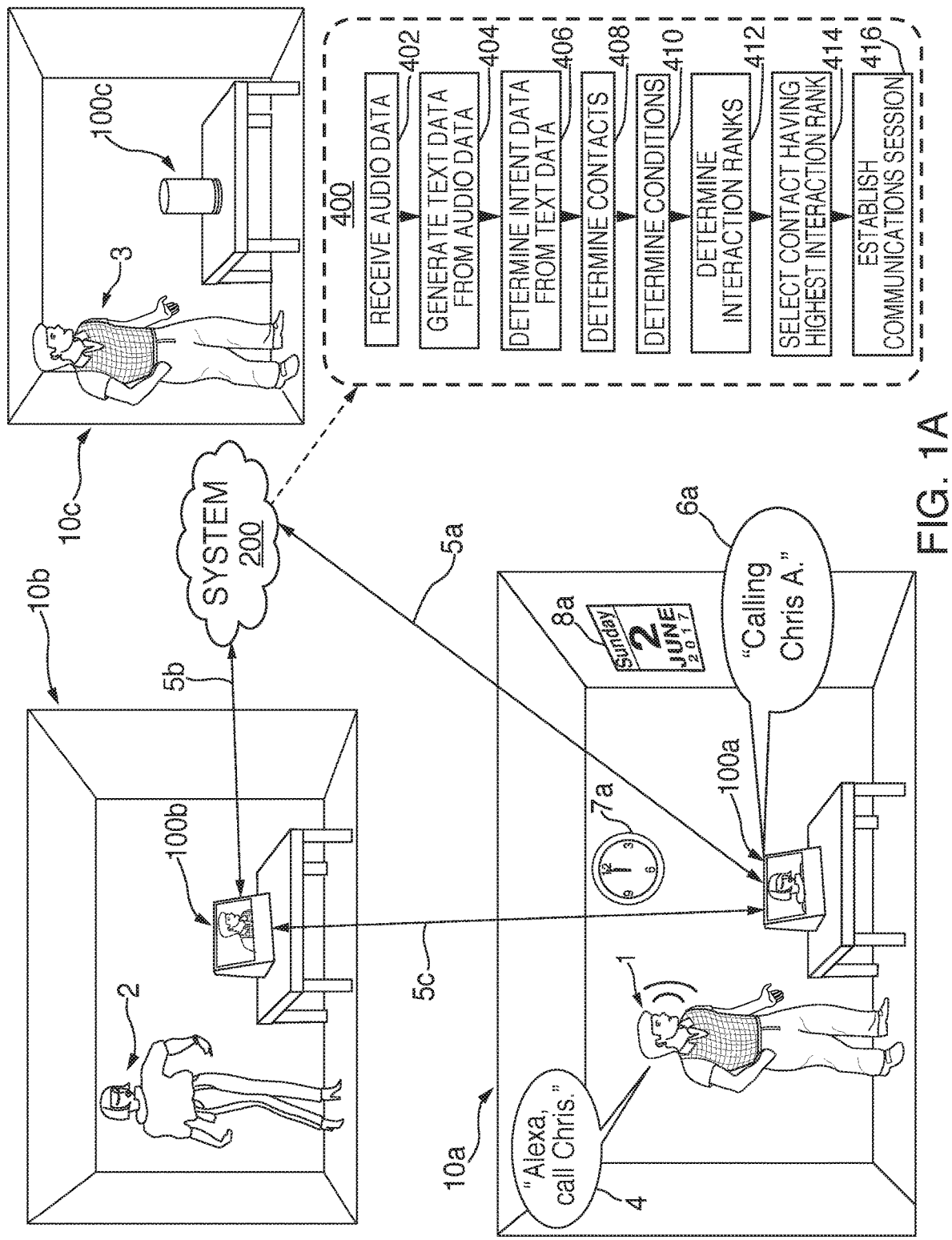
FIGS. 1A and 1B are illustrative diagrams of an exemplary system for establishing a communications session between an initiating device and a target device, in accordance with various embodiments.

The present disclosure, as set forth below, is generally directed to various embodiments of systems, methods, and devices related to allowing users to communicate with one another using voice-controlled devices. Devices such as Amazon's Echo are increasingly used by individuals for, among other things, communicating with friends, family, and associates, much like traditional land-line telephones have been used in earlier times. However, instead of requiring users to dial a numerical code associated with the users' intended recipients, voice-controlled devices allow users to utter the name and/or location of their intended recipients. Unfortunately, however, such utterances may lead to ambiguities when more than one contact or device appears to be the likely intended recipient, resulting in potential failures by the system architecture to open the proper communication session. For instance, a user may speak the utterance, "Call Chris" to a voice-controlled device while sitting in his or her bedroom. The user may have a user account associated with the voice-controlled device, and the user account may have multiple contacts stored under the contact name, "Chris." Accordingly, systems, methods, and devices are needed to disambiguate between contacts.

In some embodiments, an interaction rank may be employed to assess context-specific relationships between a user account and a contact. An interaction rank may be a value assigned to a particular contact as an assessment of the strength of the relationship between a user and the particular contact. For instance, contacts that most frequently communicate with a user may be assigned relatively high interaction ranks, while contacts that least frequently communicate with the user may be assigned relatively low interaction ranks. Interaction ranks may be context-specific. For instance, various sets of conditions may be categorized and contacts may be assigned different interaction ranks for each set of conditions.

Various conditions associated with a request to communicate with a contact (i.e., interaction data, which will be described in further detail below) may be analyzed to assess an interaction rank for the contact under the specified conditions. As an example, in some embodiments, a user may wish to initiate communications with a contact that the user frequently communicates with. As such, the user may speak utterance, "Alexa, Call Chris." An electronic device may receive the audio signal of the utterance and convert that signal into digital audio data. The electronic device may then transmit that audio data to a computing system. The computing system may have various subsystems, systems, and other means to process the audio data, that can be referred to as a language processing system. For instance, the system may utilize automatic speech recognition (ASR) processing to determine what words were spoken from the audio data, and that processing can produce text data such as text that states "Alexa, call Chris." The system may then utilize natural language understanding (NLU) processing to determine the intended meaning of the spoken words from the text data and output intent data that represents that meaning, and NLU processing may further determine additional information from the intent data. Intent data may be any data that includes particular details of an utterance and/or intent. For example, using NLU processing, the system may determine from the intent data that an intent of an utterance is to communicate with a contact. For instance, the system may be determine that "Alexa, call Chris" corresponds to intent data that states, "{Wakeword:Alexa}, {Intent:Call} {Target:<Contact>Chris}" such that a contact or device known as "Chris" must be communicated with. From the intent data, text data representing the target "Chris" may be determined or otherwise generated. Further, the system may determine a user account associated with the electronic device to access contacts stored in memory that are associated with the user account. Each contact may be represented by text data (e.g., a contact name) that may then be compared to the text data representing the target "Chris" to determine which contact is to be communicated with.

In some embodiments, there may be multiple contacts stored in memory that can be identified, at least in part, using the name "Chris" such that disambiguation may be needed. For instance, one contact may be represented by the contact name "Chris A," another contact may be represented by the contact name "Chris B," and another contact may be represented by the letters "Chris C." Accordingly, various disambiguation processes may need to be utilized to determine which contact identified by the name "Chris" is more likely to be the intended target of the intent to initiate a communications session.

In some embodiments, additional information may be used to help determine which contact represented by at least the letters "Chris" may be the most likely intended target. For instance, historical intent data stored in memory may be analyzed to indicate that the user account associated with the electronic device most frequently communicates with the contact represented by the letters "Chris A." Accordingly, at the time the utterance "Alexa, call Chris" is spoken, a high interaction rank may be given to "Chris A." under general conditions. The general conditions may represent an absence of specific conditions (e.g., instances in which no specific conditions are met). For instance, under specific conditions, it may be more likely that in a particular context (e.g., a date or time of day), another contact may be more likely to be the intended target.

For instance, in some embodiments, it may be the birthday of a particular contact. Accordingly, a specific condition can be determined by the system that may indicate that, based on the date and information associated with the user's contacts, a particular contact may be of greater importance on that date, and therefore the contact may have a particularly high interaction rank on that date. In other embodiments, the user account may initiate communications sessions with a particular user at a particular temporal interval (e.g., on a particular day of the week, hour of the day, minute of the hour, or some combination thereof). For instance, if a user most frequently communicates with "Chris A," but also consistently communicates with "Chris B" at a particular day of the week and at a particular time of the day, requests by the user to communicate with "Chris" on that particular day of the week and at that particular time of the day may result in a higher interaction rank for "Chris B" than "Chris A."

As another example, the particular electronic device being used to initiate the communications session may itself be a relevant condition. For instance, Chris A. may be classified as a work-related contact, and a user normally calls Chris A. from his or her work office. The system may assign a relatively high interaction rank to "Chris A" when an intent is determined to call "Chris" using an initiating device located at the user's work office, or if the request to initiate a communication to "Chris" is made during "normal" business hours (e.g., 9-5 Monday-Friday). Alternatively, if Chris B is a personal friend of the user, and the user utters the request to call "Chris" using an electronic device located in his or her home, then the system may assign a relatively high interaction rank to "Chris B" when an intent is determined to call "Chris" using an initiating device located in the user's home, or is the request is made outside of "normal" business hours.

In some embodiments, interactions between a user account and its associated contacts may be frequently assessed in order to generate up-to-date interaction ranks for a multitude of conditions. For instance, interaction data between a subject user account and its contacts may be stored in memory for continued assessment, even when a communications session is not presently being initiated or attempted. Interaction data for a particular contact may be any data relating to the various conditions under which a communications session was established between a user and that contact. For instance, interaction data may be assessed instantaneously, hourly, daily, weekly, monthly, or in accordance with some other temporal interval, that may be desirable to produce current interaction ranks for various conditions. In some embodiments, interaction data may be assessed instantaneously or substantially instantaneously with the processing of intent data to communicate with a particular contact such that new interaction ranks (or revised ranks) can be determined as the user interacts with the system. Interaction data may include, but is not be limited to: frequency of which communications sessions are established, which parties the user more frequently initiates communications sessions with (e.g., more weight in an assessment may be given to instances in which the user initiates the communications session than instances in which the contact initiates the communications session), the times of day at which communications sessions are established, the length of communications sessions, the mode of communication used (e.g., messages, calls, "drop-ins," etc.), etc.

As yet another example, in some embodiments, if a selection by a user is needed to disambiguate contacts, the conditions under which that selection was made (and/or, the conditions under which the initial utterance to communicate with a target is made) may be determined, stored in memory, and/or assessed to determine future interaction ranks based on the specified conditions.

As another example, in some embodiments, if an attempt to initiate a communications session is canceled by a user, a system may determine that an incorrect contact was selected for the communications session, and thus, under those conditions (and/or under general conditions), interaction ranks should be lower. Put another way, the system may learn the conditions under which communications sessions should not be initiated, and apply that learning to future determinations. Accordingly, a system may instantaneously generate a new interaction rank for that particular contact under the determined specified conditions, and may additionally generate a new interaction rank for a contact having a similar name that is ultimately selected for initiation of a communications session with within a short time after the cancellation is made. For instance, if a system erroneously selects "Chris C" as a target, and a user cancels the attempt to initiate a communications session with "Chris C," and roughly one minute thereafter requests to initiate a communications session with "Chris B," future requests made by the user to communicate with "Chris" may result in "Chris C" having a lower interaction rank than "Chris B" under either general conditions or under some specific conditions. In some embodiments, all of this information may be stored as interaction data to generate a historical view of which contacts are most frequently communicated with, under what special circumstances or specific conditions that may have caused an otherwise lower ranked contact to be selected for the communication session. Periodically, this interaction data may then be assessed to generate up-to-date interaction ranks for contacts.

Conditions may be stored with or associated with the data that represents the contact. In some embodiments, for example, a system may store a contact along with specified conditions and an interaction rank associated with such specified conditions. For instance, a contact named "Chris C" may be stored as having an interaction rank of 40 (or, for example "LOW" or "MEDIUM") by default (i.e., under general conditions), an interaction rank of 70 on Sundays, and further still an interaction rank of 95 (or, for example, "HIGH") on Sundays at 1:00 PM. If a user ceases to communicate with "Chris C" under the specified conditions, however, the stored interaction ranks corresponding to those conditions may decrease over time.

In some embodiments, the party initiating the communications session may be factored into the assessment and determination of an interaction rank. For instance, if a user is recently the target of a failed attempt to establish a communications session (e.g., a "missed call"), the contact attempting to initiate the most recent communications session may have a high interaction rank for a specified time after the failed attempt, such that a system allows a user to "call back" a particular contact.

In some embodiments, multiple electronic devices may be associated with a specific contact. For instance, if, after disambiguating contacts, it is determined that Chris A is the intended target, it may be further determined that two electronic devices are associated with Chris A: a first device located in Chris A's home and a second device located in Chris A's office. Thus, interaction ranks may be assigned to different devices belonging to the contact "Chris A" such that under particular conditions, Chris A may be contacted at different devices. For instance, if Chris B is a personal friend of a user, and the user speaks with Chris B early during the day via a device associated with "Chris B" at Chris B's work, and later at night via a device associated with "Chris B" at Chris B's home, then a relatively high interaction rank may be assigned to the work device of Chris B during the day, and a relatively lower interaction rank may be assigned to the work device of Chris B at night.

Figure 1B:
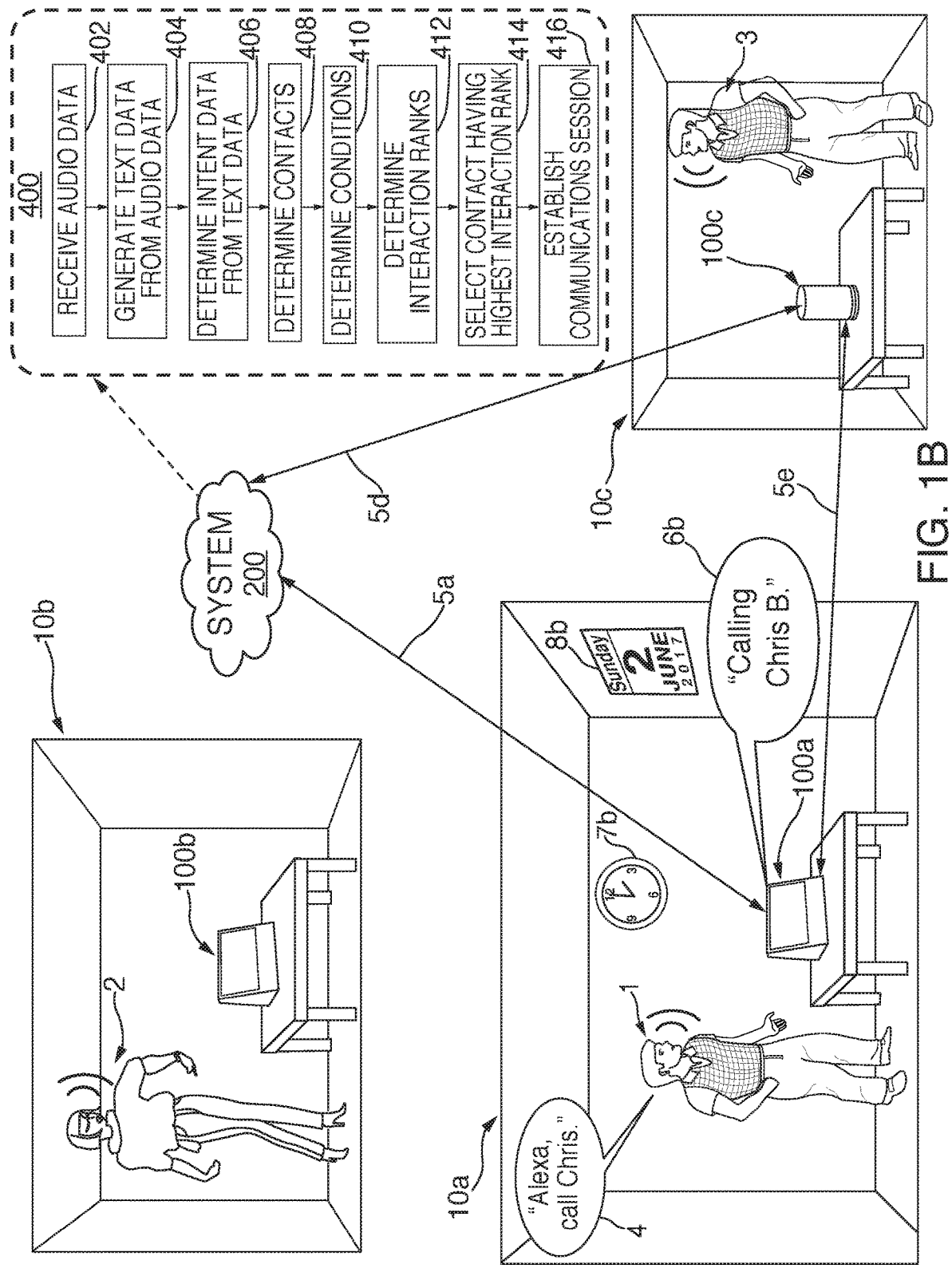

FIGS. 1A and 1B are illustrative diagrams of an exemplary system for establishing a communications session between an initiating device and a target device, in accordance with various embodiments. In a non-limiting embodiment illustrated in FIG. 1A, an individual 1 may have two acquaintances, individual 2 and individual 3. Individual 1 may be present in a first location 10a with a voice-activated electronic device 100a, while individual 2 may have a voice-activated electronic device 100b in location 10b, and individual 3 may have a voice-activated electronic device 100c in a third location 10c. Individual 1 may wish to communicate with individual 2, and may assume or otherwise know that individual 2 is located in location 10b with device 100b.

Accordingly, individual 1 may speak utterance 4 that may say "Alexa, call Chris." Utterance 4 may be received by device 100a, converted into audio data, which can be transmitted via communications channel 5a to computing system 200. System 200 may perform various processes, such as ASR and NLU processing to carry out process 400 (ARS, NLU and process 400 will each be described in further detail below). For instance, system 200 may determine a user account associated with device 100a and perform ASR and NLU processing to determine that an intent of utterance 4 is to communicate with a contact named "Chris." Accordingly, system 200 may receive contacts associated with the user account. In an exemplary embodiment, the user account associated with device 100a may include two contacts generally named "Chris": "Chris A." and "Chris B." System 200 may also determine that one or more conditions currently exists. A condition may be any circumstance of utterance 4, the user account, device 100a, or any other important detail or information available to device 100a and/or system 200. For instance, as indicated on clock 7a and calendar 8a, a time and date during which utterance 4 is spoken may be Noon on Sunday, Jun. 2, 2017. Thus, a condition may be that the time is Noon, the day of the week is Sunday, the month is June, the day of the month is the 2nd day, the year is 2017, or any combination thereof.

In some embodiments, based on one or more conditions, contacts associated with the user account may be assigned a unique interaction rank, or interaction ranks previously assigned to contacts may be retrieved from memory. An interaction rank may be a value representing how likely, based on one or more conditions, a particular contact is the target for the intent to communicate. For instance, individual 1 may contact individual 2 at Noon on Sundays with some degree of frequency, and individual 1 may contact individual 3 considerably less frequently than he/she does with individual 2. Accordingly, based on the condition (e.g., the date and time utterance 4 was received by device 100a), contact information representing individual 2 may correspond to a higher interaction rank than an interaction rank corresponding to contact information corresponding to individual 3. Thus, the system may favor the contact whose information corresponds to a higher interaction rank, which in this case is individual 2.

In some embodiments, system 200 may select the contact whose information is associated with the highest interaction rank. For instance, continuing the exemplary embodiment illustrated in FIG. 1A, system 200 may determine that individual 2 is the intended target of individual 1's intent to communicate, and accordingly select individual 2 (or, more specifically, a device belonging to, or otherwise associated with, individual 2) to initiate a communications session. Specifically, system 200 may select device 100b to initiate a communications session with device 100a. Accordingly, system 200 may communicate with device 100b via communications channel 5b such that communications channel 5c is established between device 100a and device 100b. System 200 may indicate this to individual 1 in order to provide a satisfying user experience by outputting audio signal 6a, which says "Calling Chris A."

In the exemplary embodiment illustrated in FIG. 1B, the target contact for establishing a communication with individual 1 may be individual 3 rather than individual 2. In the embodiment shown in FIG. 1B, conditions that existed with respect to FIG. 1A may differ from conditions with respect to the circumstances present in FIG. 1B. For instance, as indicated by clock 7b and calendar 8b, the time of day is different. As such, a condition that may be determined by system 200 may be that the time is 2:00 PM (or alternatively, 14:00 according to a 24-hour clock located within one or more of devices 100a, 100b, and 100c or within system 200), the day of the week is Sunday, the month is June, the day of the month is the 2nd day, the year is 2017, or any combination thereof. As such, system 200 may determine different interaction ranks based on the conditions shown in FIG. 1B. For instance, an interaction rank corresponding to contact information representing individual 3 may be higher than an interaction rank corresponding to contact information representing individual 2. Accordingly, system 200 may determine that individual 3 is the intended target of the communications session with individual 1 and select individual 3 (or more specifically, a device belonging to, or otherwise associated with, individual 3). As such, system 200 may communicate with device 100c via communications channel 5d, and thereby establish a communications session between devices 100a and 100c via communications channel 5e.

Figure 2:
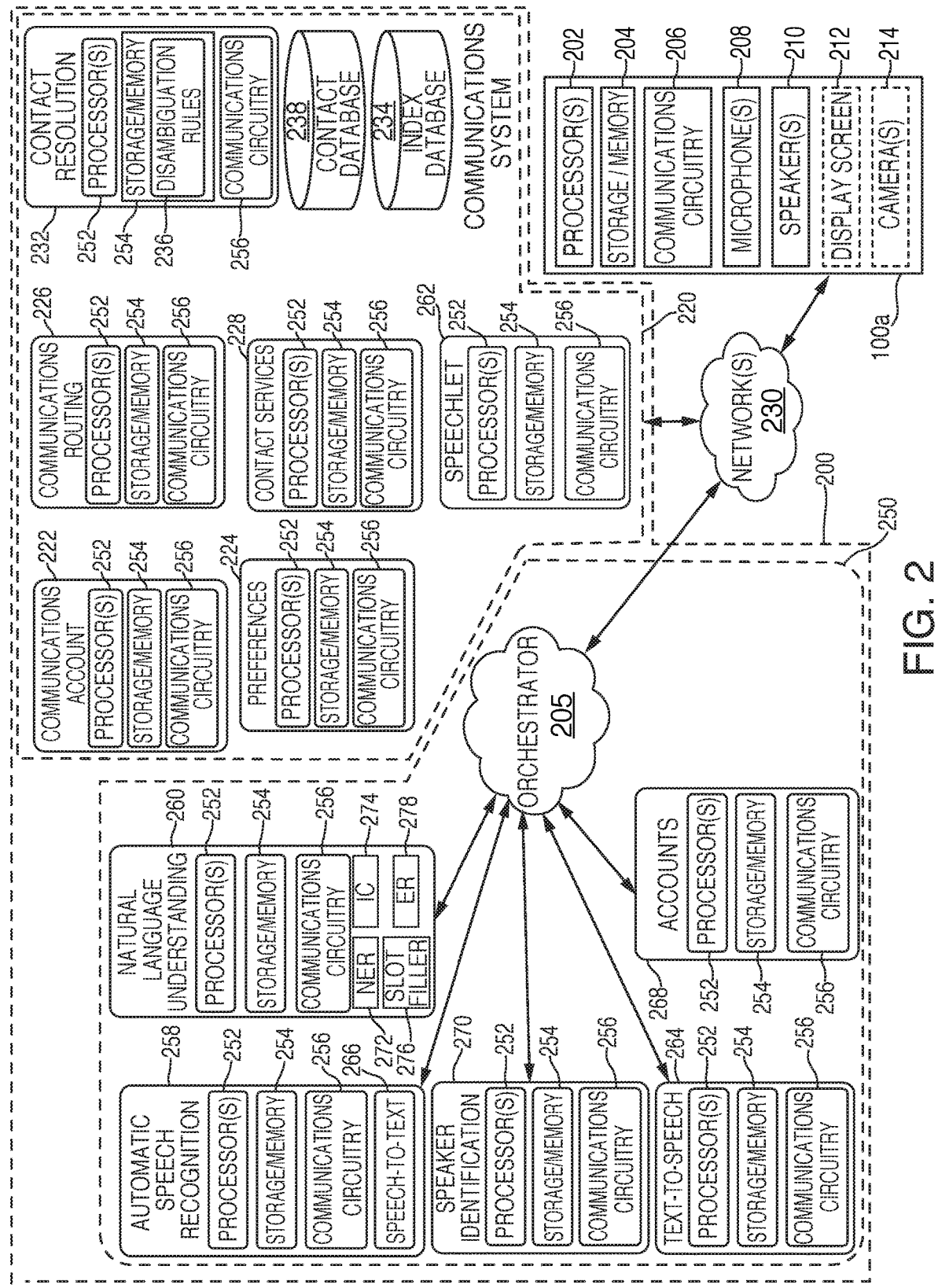
FIG. 2 is an illustrative diagram of an exemplary system architecture that can be utilized by, for example, the systems shown in FIG. 1A and FIG. 1B, in accordance with various embodiments.

FIG. 2 is an illustrative diagram of an exemplary system architecture that can be utilized by, for example, the systems shown in FIG. 1A and FIG. 1B, in accordance with various embodiments. Electronic device 100a may, in some embodiments, include sound controlled functionality, such as one or more voice or sound activated components. In some embodiments, electronic device 100a may be configured such that it may communicate with computing system 200, and in particular an orchestrator of speech-processing system 250, in response to detecting an utterance that includes a wakeword, which may subsequently be followed by a request, a question, a statement, or an intent, for instance. Similarly, electronic device 100a may alternatively or additionally include one or more manually activated components for manually controlled functionality. In this particular scenario, electronic device 100a may also be configured, in some embodiments, to communicate with computing system 200, and thus speech-processing system 250, in response to a manual input being detected by one or more input mechanisms, such as a touch screen, a button, and/or a switch, for example.

In non-limiting embodiments, electronic device 100a may be capable of being activated in response to detecting a specific sound, such as a wakeword, as well as, or alternatively, via one or more inputs. After detecting a specific sound (e.g., a wakeword or trigger expression), electronic device 100a may recognize commands (e.g., audible commands, inputs, etc.) within captured audio, and may perform one or more actions in response to the received commands. Furthermore, electronic device 100a may also be configured to perform one or more actions in response to detecting a particular touch, or other mechanical inputs via electronic device 100a.

Electronic device 100a may correspond to any suitable type of electronic device including, but not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100a may be relatively simple or basic in structure such that no, or a minimal number of, mechanical input option(s) (e.g., keyboard, mouse, track pad) or touch input(s) (e.g., touch screen, buttons) are included. For example, electronic device 100a may be able to receive and output audio, and may include power, processing capabilities, storage/memory capabilities, and communication capabilities. However, in other embodiments, electronic device 100a may include one or more components for receiving mechanical inputs or touch inputs, such as a touch screen and/or one or more buttons.

Electronic device 100a, in some embodiments, may include a minimal number of input mechanisms, such as a power on/off switch such that functionality of electronic device 100a may solely or primarily be through audio input and audio output. For example, electronic device 100a may include, or be in communication with, one or more microphones that listen for a wakeword by continually monitoring local audio. In response to the wakeword being detected, electronic device 100a may establish a connection with computing system 200 and/or speech-processing system 250, send audio data to computing system 200 and/or speech-processing system 250, and await/receive a response from computing system 200 and/or speech-processing system 250. In some embodiments, however, non-voice/sound activated devices may also communicate with computing system 200 and/or speech-processing system 250 (e.g., push-to-talk devices). For example, in response to a button or touch screen being pressed, or a button or touch screen being pressed and held, a microphone associated with electronic device 100a may begin recording local audio, and may establish a connection with computing system 200 and/or speech-processing system 250, send audio data representing the captured audio to computing system 200 and/or speech-processing system 250, and await/receive a response from computing system 200 and/or speech-processing system 250.

It should be recognized that the illustrative embodiment shown in FIG. 2 shows computing system 200 to include speech-processing system 250, and communications system 220, this is merely exemplary, and speech-processing system 250 and communications system 220 may be separate, physically, logically, or both, from computing system 200. For example, speech-processing system 250 and/or communications system 220 may be located within a dedicated computing device such as one or more servers, which may or may not be in communication with computing system 200 and/or one or more additional devices.

Electronic device 100a may include one or more processors 202, storage/memory 204, communications circuitry 206, one or more microphones 208 or other audio input devices (e.g., transducers), one or more speakers 210 or other audio output devices, an optional display screen 212, and one or more optional cameras 214 or other image capturing components (the "optional" nature of those components is indicated by the dashed outline of those specific components). However, one or more additional components may be included within electronic device 100a, and/or one or more components may be omitted. For example, electronic device 100a may also include a power supply or a bus connector. As still yet another example, electronic device 100a may include one or more additional input and/or output mechanisms, such as one or more buttons, or one or more switches or knobs. As another example, electronic device 100a may lack a display screen. Furthermore, while electronic device 100a may include multiple instances of one or more components, for simplicity only one of each component has been shown.

In some embodiments, electronic device 100a may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, electronic device 100a may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100a may include one or more microphone(s) 208. These microphone(s) 208 may receive audio input signals, which in turn may be sent to computing system 200 and/or speech-processing system 250 in response to a wakeword engine of electronic device 100a determining that a wakeword was uttered.

Processor(s) 202 may include any suitable processing circuitry capable of controlling operations and functionality of electronic device 100a, as well as facilitating communications between various components within electronic device 100a. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 302 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100a, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100a.

Storage/memory 204 may include one or more types of storage mediums such as any volatile or non-volatile memory, or any removable or non-removable memory implemented in any suitable manner to store data for electronic device 100a. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may store one or more audible and/or visual messages to be provided to electronic device 100a for indicating that a communications session is about to end if speech is not detected. For example, storage/memory 204 may store one or more audible messages and/or GUIs that include a counter that counts down from a preset time until zero, at which point the communications session may end.

In some embodiments, storage/memory 204 may include a media system, which may be configured to facilitate communications between electronic devices 100a and computing system 200. For example, the media system may store one or more communications protocols that may be executed by processor(s) 202 for facilitating communications for device 100a. In some embodiments, a sessions initiation protocol ("SIP") may be used to facilitate media transfer between electronic device 100a and one or more of computing system 200 (e.g., communications system 220) and another electronic device 100a. SIP, for example, is an application layer protocol that is text based, and may employ Real-time Transport Protocol ("RTP") or Secure Real-time Transport Protocol ("SRTP") functions. In particular, PJSIP communications functionality may be employed by the media system to support audio, video, presence, and messaging communications for electronic device 100a. In some embodiments, a Web Real-Time Communications ("WebRTC") protocols may be employed by electronic device 100a. In a non-limiting embodiment, the media system may include instructions that indicate which communications protocols to employ for facilitating media transfer between devices based on a device type of electronic device 100a. For example, if electronic device 100a does not include display 212 and/or camera 214, then the media system may indicate that PJSIP should be used, whereas if electronic device 100a includes display 212 and/or camera 214 then the media system may indicate that WebRTC protocols should be used.

In some embodiments, storage/memory 204 may include one or more systems and/or databases, such as a speech activity detection system, a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210.

The wakeword database may be a database stored locally by storage/memory 204 of electronic device 100a, and may include a list of current wakewords for electronic device 100a, as well as one or more previously used, or alternative, wakewords electronic device 100a. In some embodiments, an individual may set or program a wakeword for their electronic device 100a. The wakeword may be programmed directly on electronic device 100a, or a wakeword or wakewords may be set by the individual via a local client application that is in communication with computing system 200 and/or speech-processing system 250. For example, an individual may use their mobile device having the speech-processing system application running thereon to set the wakeword. The specific wakeword may then be communicated from the mobile device to speech-processing system 250, which in turn may send/notify electronic device 200a of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100a. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR processing. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100a may then begin transmitting the audio signal to speech-processing system 250 for detecting and responds to subsequent utterances made by an individual.

Communications circuitry 206 may include any circuitry allowing or enabling one or more components of electronic device 100a to communicate with one another, one or more additional devices (such as, for example, devices 100b and 100c as shown in FIGS. 1A and 1B), servers, and/or systems. For example, communications circuitry 206 may facilitate communications between electronic device 100a and computing system 200. As an illustrative example, audio data representing an utterance (e.g., utterance 4 of FIG. 1) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100a and computing system 200. In some embodiments, electronic device 100a and computing system 200 and/or one or more additional devices or systems (e.g., orchestrator 205) may communicate with one another via a web browser using HTTP. Various additional communication protocols may be used to facilitate communications between electronic device 100a and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100a may include an antenna to facilitate wireless communications with a network using various wireless technologies (e.g., Wi-Fi, Bluetooth, radiofrequency, etc.). In yet another embodiment, electronic device 100a may include one or more universal serial bus ("USB") ports, one or more Ethernet or broadband ports, and/or any other type of hardwire access port so that communications circuitry 206 allows electronic device 100a to communicate with one or more communications networks.

Electronic device 100a may also include one or more microphones 208 and/or transducers. Furthermore, one or more microphones located within a separate device may be in communication with electronic device 100a to capture sounds for electronic device 100a. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100a may include multiple microphones (e.g., four, seven, ten, etc.) placed at various positions about electronic device 100a to monitor/capture any audio outputted in the environment where electronic device 100a is located. The various microphones 208 may include some microphones optimized for distant sounds, while some microphones may be optimized for sounds occurring within a close range of electronic device 100a. In some embodiments, microphone (s) 208 may only begin to detect audio signals in response to a manual input to electronic device 100a. For example, a manually activated device may begin to capture audio data using microphone(s) 208 in response to a user input, such as pressing a button, tapping a touch screen, or providing any touch input gesture to a touch input component.

Electronic device 100a may include one or more speakers 210. Furthermore, electronic device 100a may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100a may be located. In some embodiments, speaker(s) 210 may include headphones or ear buds, which may be wirelessly wired, or hard-wired, to electronic device 100a, that may be capable of broadcasting audio directly to an individual.

In some embodiments, one or more microphones 208 may serve as input devices to receive audio inputs. Electronic device 100a, in the previously mentioned embodiment, may then also include one or more speakers 210 to output audible responses. In this manner, electronic device 100a may function solely through speech or audio, without the use or need for any input mechanisms or displays, however this is merely exemplary.

Display screen 212 may correspond to a display device and/or touch screen, which may be any size and/or shape and may be located at any portion of electronic device 100a. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100a. For instance, electronic device 100a may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100a may be configured to determine which pixels are associated with a particular location point, and which item or items are also displayed at that pixel location. Furthermore, electronic device 100a may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100a, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra high definition displays.

In some embodiments, electronic device 100a may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100a may include multiple cameras 214, such as one or more front-facing cameras and/or one or more rear facing cameras. Furthermore, camera(s) 214 may be configured to recognize far-field imagery (e.g., objects located at a large distance away from electronic device 100a) or near-filed imagery (e.g., objected located at a relatively small distance from electronic device 100a). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100a. For instance, camera(s) 214 may be external to, and in communication with, electronic device 100a. For example, an external camera may be capable of capturing images and/or video, which may then be provided to electronic device 100a for viewing and/or processing.

It may also be recognized that, in accordance with some embodiments, display screen 212 and/or camera(s) 214 may be optional for electronic device 100a. For instance, electronic device 100a may function using audio inputs and outputting audio, and therefore display screen 212 and/or camera(s) 214 may not be included. Furthermore, in some embodiments, electronic device 100a may not include display screen 212 and/or camera(s) 214, but instead may be in communication with display screen 212 and/or camera(s) 214. For example, electronic device 100a may be connected to a display screen via a Wi-Fi (e.g., 802.11 protocol) connection such that visual content sent to electronic device 100a may be sent to the display screen, and output thereby.

In one exemplary embodiment, electronic device 100a may include an additional input/output ("I/O") interface. For example, electronic device 100a may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100a may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100a. For example, one or more LED lights may be included on electronic device 100a such that, when microphone(s) 208 receives audio, the one or more LED lights become illuminated signifying that audio has been received by electronic device 100a. In some embodiments, one or more vibrating mechanisms or other haptic features may be included with electronic device 100a to provide a haptic response to an individual.

In some embodiments, electronic device 100a may include radio-frequency identification ("RFID") functionality and/or near field communication ("NFC") functionality. Furthermore, in some embodiments, electronic device 100a may include one or more infrared ("IR") sensors and one or more IR emitters. The IR sensors/emitters may be used to determine depth information. For example, in some embodiments, a distance of an individual from electronic device 100a may be determined using the one or more IR sensors/emitters. Depth determination may be performed using any depth determination technique. In some embodiments, a distance between an individual and electronic device 100a may be employed as a basis for presenting content with varying density using display screen 212. For example, when an individual is at a distance A from electronic device 100a, electronic device 100a may display weather data for a current day. However as the user moves closer to electronic device 100a, such as at a distance B from electronic device 100a, which may be less than distance A, electronic device 100a may display weather data for a current week. For instance, as the individual gets closer to electronic device 100a, the ability of the individual to see denser content increases, and as the individual moves father away from electronic device 100a, the individual's ability to see denser content decreases. This, for example, may ensure that the content displayed by electronic device 100a is continually relevant and readable by the individual.

Computing system 200, in a non-limiting, exemplary embodiment, may include speech-processing system 250. However, in other embodiments, speech-processing system 250 may be separate from, or in communication with, computing system 200. Generally, speech-processing system 250 may, in some embodiments, include one or more remote devices capable of receiving and sending content from/to one or more electronic device, such as electronic device 100a. Speech-processing system 250 may include various components and systems including, but not limited to, ASR system 258, NLU system 260, TTS system 264, and user accounts system 268. In some embodiments, speech-processing system 250 may also include computer readable media, including, but not limited to, flash memory, random access memory ("RAM"), and/or read-only memory ("ROM"). Speech-processing system 250 may also include various systems that store software, hardware, logic, instructions, and/or commands for speech-processing system 250, such as a speaker identification ("ID") system, or any other system, or any combination thereof.

Speech processing system 250, in a non-limiting, exemplary embodiment, may include orchestrator 205. Orchestrator 205 may include one or more processors and communications circuitry for communicating with the various components of speech-processing system 250 and communications system 220 (which will be described in further detail below). For instance, orchestrator 205 may be capable of receiving data and sending instructions to various systems and other components of computing system 200 to process that data. For instance, in some embodiments, orchestrator 205 may receive audio data and forward that data to ASR system 258. Upon determining that text data is generated by ASR system 258, orchestrator 205 may send instructions to ASR system 258 to forward the text data to NLU system 260. This may continue from system to system as necessary to process, for instance, intent data. Orchestrator 205 may essentially be a central processing unit capable of sending commands to each component of the systems described herein (particularly, the system of FIG. 2) in order to process, for instance, intent data. The manner in which orchestrator 205 controls these various systems, as well as determines the specific functions to be executed by those systems, will be discussed in further detail below. Orchestrator 205 may further include memory for temporarily storing data to be processed by ASR system 258, NLU system 260, speaker identification system 270, TTS system 264, user accounts system 268, speechlet 262, and/or any other components of speech-processing system 250 and/or communications system 220.

ASR system 258 may be configured to recognize human speech in detected audio data, such as audio captured by microphone(s) 208 which may be converted to digital audio data prior to being transmitted to orchestrator 205. ASR system 258 may include, in some embodiments, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal (s) into text, such as SOFTSOUND speech processing technologies available from the Autonomy Corporation, which is headquartered in Cambridge, England, United Kingdom.

ASR system 258 may include an expression detector that analyzes audio signals received from orchestrator 205, such as the expression detector mentioned above with regards to electronic device 100*a*. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase is represented within the audio signal. The expression detector may then compare that score to a threshold value to determine whether the wakeword or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, speech-processing system 250, communications system 220, or by another device, such as a separate device or server capable of performing one or more additional functionalities thereon (e.g., a television capable of outputting video content).

NLU system 260 may be configured such that it determines user intent based on the received audio data. For example, NLU system 260 may determine that the intent of utterance 4 in FIGS. 1A and 1B is for initiating a communications session with another device that is associated with a particular contact (e.g., a device belonging to "Chris"). In response to determining intent data representing, or otherwise associated with, an utterance, NLU system 260 may communicate the received command to an appropriate subject matter server or functionality to perform one or more tasks, and/or retrieve an appropriate response or response information. NLU system 260 may include processor(s) 252, storage/memory 254, and communications circuitry 256 which, in some embodiments, may be substantially similar to processor(s) 202, storage/memory 204, and communications circuitry 206 of electronic device 100*a*, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts system 268, certain domains (e.g., music or shopping), communications account system 222 of communications system 220, and/or may be organized in a variety of other ways.

Generally, NLU system 260 receives from orchestrator 205 textual input generated by ASR system 258 and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 4) as well as the pertinent pieces of information in the text that allow an action to be completed. For example, if a spoken utterance is processed by ASR system 258 and outputs the text, "call Mom," NLU system 260 may determine that an intent of the utterance is to activate a telephone, or telephone functionality, and to initiate a call with a contact represented by a contact name "Mom." In some embodiments, NLU system 260 may process several textual inputs related to the same utterance.

For example, if ASR system 258 outputs N text segments (as part of an N-best list), then NLU system 260 may process all N outputs.

As will be discussed further below, NLU system 260 may be configured to parse and tag annotate text. For example, for the text "call Mom," "call" may be tagged as a command (e.g., a command to execute a phone call), and "Mom" may be tagged as a specific contact and target of the command (e.g., user account of a messaging system or a telephone number represented by the contact name "Mom," which may be stored in a contact list). Further, NLU system 260 may be used to provide answer data in response to queries, for example, using a knowledge base stored within storage/memory 254 of NLU system 260 and/or storage/memory of speech-processing system 250.

To correctly perform natural language understanding processing of speech input, NLU system 260 may be configured to determine a domain of an utterance. By determining the domain, NLU system 260 may narrow down which services and functionalities offered by an endpoint device (e.g., electronic device 100, speech-processing system 250, communications system 220, or any other electronic device or system) may be relevant. For example, an endpoint device may offer services relating to interactions with a telephone service (e.g., communications routing system 226), a contact list service (e.g., contact services system 228), a calendar/scheduling service, a music player service, etc. As another example, an endpoint device may enable certain services or functionalities for an individual having a user account of speech-processing system 250. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272 may then attempt to identify relevant grammars and lexical information that may be used to construe meaning of the one or more results. To do so, NER system 272 may begin by identifying potential domains that may relate to the received query. NLU system 260 may include a databases of devices within storage/memory 254 of NLU system 260 that may be used to identify domains associated with specific devices. For example, electronic device 100a may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "communications," "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular account of accounts system 268 and/or electronic device 100a. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both the communications domain and the music domain, the query may, substantially in parallel, cause the natural language understanding processing may use the grammar models and lexical information for the communications domain as well as use the grammar models and lexical information for the music domain. The responses based on the query produced by each set of models is scored, with the overall highest ranked result from all applied domains being ordinarily selected to be the correct result.

An intent classification ("IC") system 274 may parse the query to determine an intent or intents for each identified domain, where the intent corresponds to the action to be performed that is responsive to the query. Each domain is associated with a database of words linked to intents. For example, a communications intent database of a communications domain may link words and phrases such as "call" to a call contact(s) intent, "hang up" to a cease communications intent, and "mute" to a mute volume intent. As another example, a communications intent database of the communications domain may link words and phrases such as "call" to a call contact intent, "message" to a message contact intent, and the like. IC system 276 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "call Chris" is an identified intent, a grammar framework or frameworks may correspond to sentence structures such as "Call {Contact Name}," "Call {Device Name}," "Get me {Contact Name} on the line," etc. However, to make resolution more flexible, these frameworks would ordinarily not be structured as sentences, but rather based on associating slots with grammatical tags. As another example, if "Call Chris'" is an identified intent, a grammar framework may correspond to sentence structures such as "Call {Chris}." As yet another example, if "Call 'Chris'" is an identified intent of a communications domain, a grammar framework may correspond to a sentence structure such as "Call {Contact Name}," where slot data representing the slot {Contact Name} has a value "Contact Name" associated with it.

NER system 272 may parse the query to identify words as subject, object, verb, preposition, etc., based on grammar rules and/or models, prior to resolving named entities. The identified verb may be used by IC system 274 to identify intent, which is then used by NER system 272 to identify frameworks. A framework for an intent of "call" may specify a list of slots/fields/placeholders applicable to place the identified "object" such as, for example, {Contact Name}, {Device Name}, {Entity Name}, {Application Name}, {Anaphoric Term}, {Contact Name}, {Group Account Name}, {User Account Name}, {Communications Identifier} and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Call 'Chris' at work" might be parsed and tagged as {Verb}: "Call," {Object}: "Chris," {Object Preposition}: "at," and {Object Modifier}: "work." At this point in the process, "Call" may be identified as a verb based on a word database associated with a communications domain, which IC system 276 may determine corresponds to the "call contact(s)" intent. No determination has been made as to the meaning of "Chris" and "Work," but based on grammar rules and models, it may be determined that the text of these phrases relate to the grammatical object (i.e., entity) of the query. As simpler illustrative example, a query of "Call 'Contact 1'" may be parsed and tagged as {Verb}: "Call," {Object}: "Contact 1." "Call" may be identified as a verb based on a word database associated with a communications domain, which IC system 276 may determine corresponds to a "call" intent.

The frameworks linked to the intent may then be used to determine what database fields should be searched to determine the meaning of these phrases, such as searching a user's gazette for similarity with the framework slots. So a framework for a "call contact(s)" intent might attempt to resolve the identified object for {Contact Name}, {Device Name}, {Entity Name}, {Application Name}, and {Anaphoric Term} and another framework for the same intent might attempt to resolve the object modifier based on {Contact Name}, and resolve the object based on {Device Name} and {Entity Name} linked to the identified {Contact Name}. Alternatively, the framework for a "call" intent may attempt to resolve the identified object for {Contact Name} or {Communications Identifier}. If the search of the gazetteer does not resolve a slot/field using gazetteer information, NER system 272 may search the database of generic words associated with the particular domain. So, for instance, if the query was "Call Chris at work," after failing to determine a device name or other entity name called "work," NER system 272 may search the domain for devices associated with the contact "Chris."

The results of the natural language understanding processing may be tagged to attribute meaning to the query. So, for instance, "Call Chris at work" might produce a result of: {Domain}: "Communications," {Intent}: "Call contact(s)," {Contact Name}: "Chris," and {Device Name}: "Work." As another example, "Call 'Contact 1'" might produce a result of: {Domain}: Communications, {Intent}: "Call," and {Contact Name}: "Contact 1."

The output from NLU system 260 (which may include tagged text, commands, etc.) may then be sent to an orchestrator and/or a command processor, which may be located on, or may be in communication with, speech-processing system 250. The destination command processor may be determined based on the output of NLU system 260. For example, if NLU system 260 outputs include a command to communicate with a contact, the destination command processor may be a communications application, such as one located on electronic device 100a or in a communications playing application configured to execute a command to transmit a particular audio file to another device. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application. If the output of NLU system 260 includes a request to call a contact, then the destination command processor may include a communications routing processor to initiate a communication with a particular contact's communications identifier. An identifier is a unique address associated with a contact and/or device that may be used to send and/or receive communications from the specific contact and/or device.

In some embodiments, NLU system 260 may also include an entity resolution system 278, which allows NLU system 260 to query each domain of NLU system 260 to determine which domain or domains believe that they can handle a given request. Upon performing the query, each domain may return a "score" indicating a likelihood that they can handle the application in question. For instance, various domains may return scores of LOW, MEDIUM, or HIGH, indicating the likelihood that they can handle the particular application. Entity resolution system 278 may return application/system names or titles for the request, which may be based on relevance scores that estimate a confidence that a particular application/system may be best used for the request. As an illustrative example, if the utterance is, "Call 'Contact 1'," NLU system 260 may determine, using entity resolution system 278, which domain(s), and thus application(s)/functionality or functionalities, can likely handle this request, and may select the domain and/or application/functionality having the highest confidence score as being the domain and/or application/functionality able to handle the request. NLU system 260 may further include a slot filler system 276 that can apply rules or other instructions to standardize labels or tokens from previous stages into an intent/slot representation. The precise transformation may depend on the domain. For example, a communications domain may include a text mention of "<Contact Name> home," and may be transform the text mentioned to resolved contact's name (e.g., "Contact 1"). TTS system 264 may employ various text-to-speech techniques. However, techniques for transcribing text into speech are well known in the art and need not be described in further detail herein, any suitable computer implemented text to speech technique may be used to convert the text into audio signal(s) for playback on device 100a, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

Accounts system 268 may store one or more user accounts corresponding to users having a registered account on speech-processing system 250. For example, a parent may have a registered account on computing system 200, and each of the parent's children may have their own user account registered under the parent's registered account. In some embodiments, each user account on accounts system 268 may be associated with a particular account identifier, which may be associated with a device identifier. When a request is received by computing system 200, a device identifier indicating the device that the request was received from. The device identifier may then be mapped to an account identifier, which may indicate an account that the requesting device is registered to. In some embodiments, accounts system 268 may store voice biometric data representing voice biometric information for a specific user account. For example, acoustic features of a particular individual's voice may be stored for that individual's user account by accounts system 268. This may allow speaker identification techniques (e.g., speaker identification system 270) to be used to determine whether a generated vector corresponds to voice biometric data associated with a specific user account and/or a group account. In some embodiments, accounts system 268 may store a device identifier associated with a particular device, a communications identifier associated with a particular user account and/or group account, or any other suitable information, or any combination thereof. Accounts system 266 may also include processor(s) 252, storage/memory 254, and communications circuitry 256.

Speaker identification system 270, in some embodiments, may correspond to any suitable device/system capable of identifying a particular person's voice from an audio signal. Speaker identification system 270 may determine whether a current voice being used to speak matches known voice biometric data associated with a particular individual's voice. In some embodiments, voice biometric data may be stored within accounts system 268 for various individuals having a user account stored thereby. For example, individual 2 may have a user account on computing system 200 (e.g., stored within accounts system 268), which may be associated with electronic device 100a. Stored within the user account may be voice biometric data, such as stored vectors representing stored acoustic features associated with a voice of individual 1. Therefore, when an utterance, such as utterance 4, is detected by electronic device 100a, and subsequently when audio data representing that utterance is received by computing system 200, speaker identification system 270 may determine whether the voice used to speak utterance 4 matches, to at least a predefined confidence threshold, the stored voice biometric information associated with individual 2 stored by their user account. If so, then this may indicate that individual 2 is the likely speaker of utterance 4, and not individual 1.

In some embodiments, speaker identification system 270 may receive audio data representing an utterance, or a copy of the audio data, at a substantially same time as ASR system 258. The audio data may be divided into audio frames representing time intervals, with which a number of values or features representing qualities of the audio data may be determined, along with a set of those values (e.g., feature vectors or audio feature vectors) representing features/qualities of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. Speaker identification system 276 may also include a scoring component that determines respective confidence scores indicating how likely it is that an input utterance was spoken by a particular user.

When audio data is received by computing system 200, ASR system 258, speaker identification system 270, and/or any other suitable component of speech-processing system 250, may perform windowing functions to the audio data to generate framed audio data. The size of each audio frame may depend on a particular configuration of speech-processing system 250, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 100a. Alternatively, feature extraction may only be performed on audio data including speech. Feature extraction and user recognition feature extraction may include determining values (i.e., features) representing qualities of the frequency domain framed audio data, along with quantitating those features into values (i.e., acoustic feature vectors or audio feature vectors). Feature extraction may determine automatic speech recognition feature/vector data, which may assist with speech recognition processing for ASR system 258, and user recognition feature extraction may determine user recognition feature/vector data, which may assist with speaker identification/user recognition for speaker identification system 276. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

Speaker identification system 270 may perform speaker identification using various data including user recognition features/vector data, and training data that may correspond to sample audio data corresponding to known users associated with a particular device (e.g., electronic device 100*a*). Speaker identification system 270 may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then speaker identification system 270 may select the user having the greater confidence score, or may prompt the device to obtain additional information to resolve the speaker's identity.

In some embodiment, training data may be obtained and stored by user accounts system 268. The training data may be stored as waveforms and/or corresponding features/vectors, and may correspond to data from various audio samples, each audio sample associated with a known user and/or user identity. For example, each user known to the system may be associated with some set of training data for the known user. Speaker identification system 270 may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 100, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The system may then process the sample audio data to create sample training data (e.g., a feature vector of size F). The training data may then be stored by user accounts system 268 and saved for use during runtime user verification processing.

In some embodiments, speaker identification processing may further include various additional techniques to determine a speaker of an utterance. For example, device beaconing may indicate a likelihood that a particular individual's device is located proximate to electronic device 100*a*. In this particular scenario, if an individual's device is determined to be substantially close to electronic device 100*a* at a time when the wakeword is uttered, then this may indicate that the wakeword was likely spoken by that individual. As another example, historical rules may be employed to determine a speaker of an utterance. For example, one particular individual may typically interact with electronic device 100*a*, and therefore it may be more likely that when a wakeword is detected by electronic device 100*a*, that wakeword is more likely than not spoken by that particular individual. Still further, certain individuals may be interact with electronic device 100*a* during certain times, or to perform certain functions. For example, a particular individual may typically ask for a weather forecast using electronic device 100*a* during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 100*a* temporally after, and within a certain amount of time of, the specific function, then this may indicate that that individual likely spoke the corresponding utterance. Persons of ordinary skill in the art will recognize that various additional techniques may be employed to determine a speaker of an utterance, and the aforementioned are merely exemplary. Speaker identification system 270 may also include processor(s) 252, storage/memory 254, and communications circuitry 256.

Additionally, in some embodiments, user accounts system 268 may store contacts associated with a particular user account and/or user profile. Further, in some embodiments, contacts stored in user accounts system may include telephone numbers (i.e., public switched telephone network ("PSTN") contacts), usernames and other information associated with third party messaging networks, and internal user accounts associated with first party messaging networks. Further still, in some embodiments, user accounts system 268 may store devices belonging to a particular user account and/or user profile.

In some embodiments, user accounts system 268 may store contact names that were assigned to represent any group of contacts. For instance, a user may collectively assign various contacts of his or her family members the entity name "Home," "Family," or any other entity name. As another example, a user may collectively assign devices belonging to his or her user account (each of which belonging to himself/herself and/or a member of his/her family) the entity name "Home," "Family," or any other entity name. As another example, user accounts system 268 may store a combination of contacts, devices, and first and/or third party messaging contacts collectively as one contact name.

Persons of ordinary skill in the art will recognize that although each of ASR system 258, NLU system 260, TTS system 264, and user accounts system 268 may each include instances of processor(s) 252, storage/memory 254, and communications circuitry 256, and those instances of processor(s) 252, storage/memory 254, and communications circuitry 256 within each of ASR system 258, NLU system 260, TTS system 264, and user accounts system 268 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Computing system 200 may also include, in a non-limiting embodiment, a communications system 220, which may be configured to facilitate communications between two or more electronic devices. For example, communications system 220 may be capable of facilitating a communications session between electronic device 100*a* and at least electronic devices 100*b* and 100*c* of FIGS. 1A and 1B. Upon speech-processing system 250 determining, based on intent data, that an intent of an utterance is for a communications session to be established with another device, computing device 100*a* may access communications system 220 to facilitate the communications session between the initiating device and the receiving device. For example, communications system 220 may employ VoIP functionality to facilitate audio, video, and/or text data communications between the initiating device and the recipient device.

Communications system 220 may include, in some embodiments, speechlet 262 may, for example, correspond to various action specific systems or servers, sometimes referred to as "skills," capable of processing various task specific actions. Speechlet 262 may further correspond to first party applications and/or third party applications capable of performing various tasks or actions. For example, based on the context of the audio received from electronic device 100*a*, orchestrator 205 may use a certain functionality to generate a response, or to obtain response information, which in turn may be communicated back to electronic device 100*a*. For instance, an utterance may ask to communicate with another individual (and that individual may be associated with a user account represented by an contact name), and therefore speechlet 262 may access communications system 220 (and/or in some embodiments, third party messaging applications) to obtain contact information relating to user accounts and devices associated with or belonging to the user account associated with electronic device 100*a*. Speechlet 262 may also include processor(s) 252, storage/memory 254, and communications circuitry 256.

In some embodiments, an application of speechlet 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java systems.

Communications system 220, in one embodiment, may include a communications routing system 226. Communications routing system 226 may employ VoIP functionality to facilitate audio, video, and/or text data communications between the initiating device and the recipient device. In some embodiments, communications routing system 226 may allow a communications session to be established between an initiating device and a recipient device using one or more VoIP protocols including, but not limited to SIP, RTP, RTCP, SRTP, and SDP. In one illustrative embodiment, a SIP signaling command may be provided to communications routing system 226 for communicating with the recipient device. In particular, PJSIP functionality adds a new "user-to-user" header that indicates the device pair for the communications session. As an illustrative example, communications routing system 226 may route communications to a device's communications identifier in response to receiving an instruction to establish a communications session between one communications identifier and another.

In one embodiment, communications routing system 226 may include any suitable rules and/or prioritization schemes for organizing messages received for one or more user accounts and/or group accounts. For example, rules that cause messages having similar sender information to be grouped together may be included within communications routing system 226. In some embodiments, communications routing system 226 may include one or more rules to prioritize messages for playback. Such rules may include, but are not limited to, playback rules based on speaker identification, sender information, urgency of a message, vocal inflection, temporal aspects of the message, and/or content of the message. Communications routing system 226 may also include a message database, in one embodiment, capable of storing messages, or any other type of communication (e.g., telephone calls, text messages, emails, etc.). The message database may store each message that has been received with a corresponding user account or group account with which that message is directed to. Communications routing system 226 may also include processor(s) 252, storage/memory 254, and communications circuitry 256.

In one embodiment, communications system 220 may include communications accounts system 222, which may store one or more group accounts corresponding to one or more shared devices. Communications account system 222 may include a communications account database that stores communications identifiers for each group account and/or user account that is/are capable of communicating using communications system 220. For instance, a group account associated with one communications identifier may communicate with another group account associated with another communications identifier across a communications network facilitated by communications system 220.

In one embodiment, each communications account may be stored as being associated with account identifiers, linking accounts for speech-processing system 250 and communications system 220. For example, a shared device, such as shared voice activated electronic device 100*a*, may have its own group account stored on communications accounts system 222. The group account may be associated with the shared device, and may also be linked to one or more individual's user accounts. For example, shared electronic device 100*a* may be associated with a first group account corresponding to a first grouping of individual (e.g., a family). One or more user accounts may also be associated with the first group account (e.g., individual members of the family), corresponding to individuals that may be capable of interacting with shared electronic device 100*a*. Information, settings, and/or preferences, for example, for each user account may be stored within a user account database. In some embodiments, communications accounts system 222 and accounts system 268 may communicate with one another via network 230 to provide one another with account information associated with certain devices and communications accounts. For example, accounts system 268 may store voice biometric data for a particular user account, which may then be provided to communications accounts system 222 to determine a communications identifier and/or other communications information associated with that user account so as to allow a device associated with the user account to communicate with one or more additional devices. Communications account system 222 may also include processor(s) 252, storage/memory 254, and communications circuitry 256.

Communications system 220 may, in some embodiments, include a contact services system 228. Contact services system 228 may store contact lists, contact information, and the like, associated with one or more communications identifiers. For example, if electronic device 100*a* is registered to an account identifier associated with electronic device 100, and in particular to individual 1 who is a registered user of electronic device 100*a*, then a contact list associated with individual 1 may be accessible from contact services system 228 based on a communications identifier associated with the account identifier. In some embodiments, two or more communications identifiers may be linked together such that their contact lists may both be used to populate another contact list, such as a group account's contact list. For example, if two user accounts, corresponding to two separate users, are both associated with a same group account, then contact lists for each of the two user accounts may form the group account's contact list, which may then be associated with the account identifier. Communications system 220 may, as an illustrative example, store contact information associated with each contact entry of a communications identifier's corresponding contact list. For example, a contact list associated with a particular communications identifier may indicate contact identifiers for each contact of that contact list. For each contact identifier, contact information, such as, but not limited to, contact names, device names, communications identifiers, additional contacts, group accounts, telephone numbers, location information, presence information, and the like, may be stored within storage/memory 254 of contact services system 228. Contact services system 228 may also include processor(s) 252, storage/memory 254, and communications circuitry 256.

Communications system 220 may also, in one embodiment, include a preferences system. Preferences system 224 may, in one embodiment, store information associated indicating which group accounts have granted a requesting group account with permission to establish a communications session with that group account. For example, upon a new contact being added to contact management system 228, a prompt may be provided to an individual to determine whether communication session privileges are allowed for that contact such that the contact may be able to establish a communications session with the individual (or other individuals associated with the shared electronic device) without requiring the individual to "accept" or "approve" the communications session. In some embodiments, the permission may be automated such that individuals that have granted permission to certain group accounts will be automatically stored by preferences system 224. When a user requests for contacts to be displayed, preferences system 224 may be accessed to obtain a list of group accounts that have authorized a particular group account associated with the request. Preferences system 224 may then provide a supplemental list, or list metadata, that indicates which group accounts stored within the contacts list of the communications account system 222 for the requesting device have granted the permission to the requesting group account. Preferences system 224 may also include processor(s) 252, storage/memory 254, and communications circuitry 256.

Communications system 220 may also, in one embodiment, include contact resolution system 232. Contact resolution system 232 may be configured to resolve, or attempt to resolve, a particular contact from a contact list. In particular, contact resolution system 232 may be configured to resolve one contact from two or more contacts that have been identified by ER system 278 during entity resolution processing. When a user speaks an utterance, such as "Call '<Contact Name>'," "Message <Contact Name>," and the like, audio data representing the utterance may first be provided to ASR system 258. ASR system 258 may generate text data representing the audio data such that the utterance is parsed into token text strings, such as "call" and "<Contact Name>," as well as an N-best list of token hypotheses. For each hypothesis, a corresponding confidence score may be attached indicating how confident ASR system 258 is that a particular hypothesis is a particular spoken word. NLU system 260 may then identify an intent and slot of the utterance based on the text data. For example, NLU system 260 may identify the intent of the utterance "Call 'Contact 1'" as being a call intent, and may further determine that the call intent has a "Contact Name" slot associated with it. Continuing the aforementioned example, the slot may be determined to have a value "Contact 1." Thus, ER system 278 may attempt to resolve the information attributed to the slot—{Contact Name}: "Contact 1"- to a specific entity. In one embodiment, contact resolution system 232 may host its own entity resolution system, contact services ER system 234, which may reside as part contact services system 228.

Communications system 220, in one embodiment, may include a contact database 238, which may be searched for contacts that are associated with the value attributed to the contact name slot. When a contact is added to an individual's contact list, that contact's information may be stored by contact database 238 and used by Contact services ER system 234 during entity resolution processing. For instance, ER system 278 may invoke Contact services ER system 234 for searching for contacts matching the text value. A contact list may be searched for the text value "Contact 1" to identify any contact entries from the contact list that substantially match the text value. In some embodiments, similar sounding words/names, double metaphones, and the like, as that of the text value may also be queried. For example, a contact named "Bob" may sound similar to a contact named "Rob," and therefore both "Bob" and "Rob" may be searched for within the contact list. As another example, a contact named "John" may also sound similar to another contact named "Jon," and therefore both "John" and "Jon" may be searched for within the contact list. The searching of the contact list within contact database 234 may result in a list of contact entries—an entry within the contact list associated with a particular contact name—as well as contact identifiers associated with those contact entries. Thus, ER system 278 may yield entity resolution results as contact identifiers likely corresponding to contact entries of the contact list whose contact name substantially matches the input text value attributed to the contact name slot.

Contact resolution system 232 may, in one embodiment, be responsible for obtaining contacts (e.g., represented by contact identifiers) from contact services system 228. Contact services system 228 may store information for each of the contacts (e.g., communications identifiers, telephone numbers, group account information, etc.). If there are more than one contact identifier received by NLU system 260 (e.g., ER system 278 yields two or more contact identifiers), then disambiguation rules 236 of contact resolution system 232 may be invoked to process the contact identifiers from the entity resolution results. The various disambiguation processes included by disambiguation rules 236 may include filtering contact identifiers based on properties associated with the corresponding contact entries, contact information associated with the contact identifiers, and/or any other suitable criteria. For example, contact identifiers are associated with contact entries that had a confidence score from ASR system 258 of being less than a particular threshold (e.g., MEDIUM or LOW confidence score), may be removed from consideration. Contact identifiers that have previously been considered for contact resolution (e.g., part of a skip list) may be ignored. Furthermore, contact identifiers may be removed based on their communications information. For example, contact identifiers that are unassociated with communications identifiers of communications account system 222 may be removed from consideration. In one embodiment, contact identifiers that are determined to be ignored (e.g., not to be resolved to be the entity that the communications request is to be associated with) may also be added to a skip list. Thus, generally speaking, the goal of contact resolution system 232 is to return a single contact object (e.g., a communications identifier, telephone number, email address, etc.) to a speechlet/command processor such that the communications intent (e.g., a call intent) may be facilitated.

In some embodiments, communications system 220 may further include an index database 234. Index database 234 may store contact information obtained from contact database 238 in an indexed manner such that elastic searching, or any other type of searching, may be used to search for a particular contact. When an individual uploads contact information for a particular contact's entry, that information may be provided to both contact database 238 and index database 234. Index database 234 may parse the contact information into various categories capable of being searched using different search queries. For example, contact information associated with a first contact entry may include a first name, a last name, a group account, a telephone number, an email address, and the like. Index database 234 may parse the contact information into each respective element. Therefore, when a query is made (e.g., get_contacts("Bob")), each of the first name, last name, group account, telephone number, and email address may be searched for the value "Bob." Persons of ordinary skill in the art will recognize that any suitable indexing technique and query term may be employed by index database 234, and the aforementioned is merely exemplary.

Figure 3:
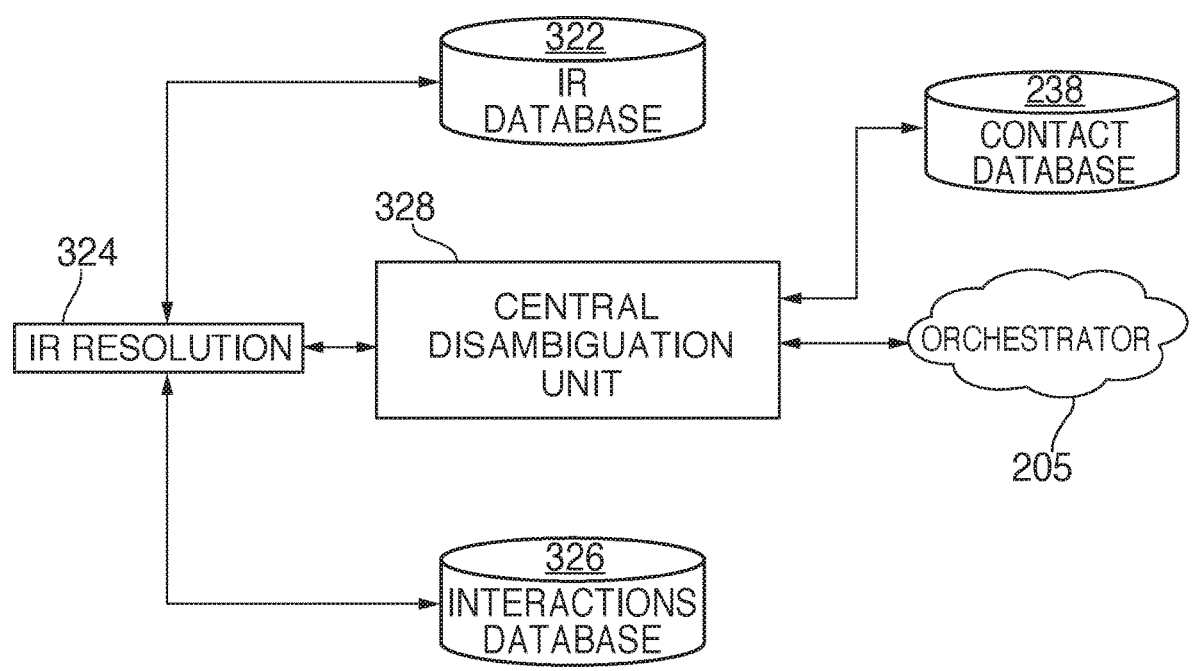
FIG. 3 is an illustrative diagram of an exemplary system architecture of a communications system that can be utilized by a computing system, in accordance with various embodiments.

As shown in FIG. 3, contact resolution system 232 may further include an interaction rank (IR) database 322, an IR resolution system 324, an interactions database 326, and a central disambiguation unit 328 that may communicate with IR database 322, IR resolution system 324 and interactions database 326 to process intent data. These components of contact resolution system 232 will be described in further detail below in FIG. 3.

As an illustrative example, a communications session between two devices is briefly described below to illustrate how the communications session may be established. In an example embodiment, an individual (e.g., individual 1 of FIGS. 1A and 1B) may speak an utterance (e.g., "Alexa, drop in on Chris") to their electronic device (e.g., electronic device 100a). In response to detecting the device's wakeword (e.g., "Alexa"), the electronic device may begin sending audio data representing the utterance to computing system 200, and in particular orchestrator 205, which may determine that the audio data be sent to ASR system 258 for processing. Upon receipt, ASR system 258 may perform speech recognition processing, such as STT processing, to the audio data to generate text data representing the audio data. The text data may then be passed to NLU system 260 to determine intent data representing an intent of the utterance. For example, NLU system 260 may include a listing of sample utterances to be used to disambiguate the spoken words and determine an action intended to occur for the utterance. In some embodiments, a calling speechlet system may be included within NLU system 260 that includes one or more sample utterance frameworks. If the format of the spoken utterance substantially matches one of these sample utterances, then intent data may indicate that an intent of the utterance was for a communications session to be initiated. For instance, one example sample utterance may be "{Wakeword}, {Intent: Call} {Contact Name}." If the spoken utterance's text data substantially matches this sample utterance's framework, then intent data may indicate that an intent of the utterance is to start a communications session with a contact (or device) of the user, and may also indicate that the intended target of the communications session is "Chris."

Communications system 220 may access user accounts system 268 to retrieve a list of contacts (and/or, in some embodiments, a list of contacts and/or devices) associated with the user account that are represented by a contact name that closely matches the name "Chris." In some embodiments, user accounts may return multiple contact names closely matching the target name, "Chris" (e.g., "Chris A.," "Chris B.," "Kristy," etc.).

In some embodiments, based on intent data, it may be determined that multiple contacts closely match the target name. Thus, various methods of disambiguating the contact may be performed. For instance, an interaction rank may be utilized to determine the strength of a contact's relationship with the user account associated with the device. This interaction rank may be dependent on the condition, and may be determined ad hoc, or may be determined via previously identified information. For instance, in an embodiment, an interaction rank may be determined ad hoc by communications system 220 and/or speech-processing system 250 determining one or more conditions associated with the intent. As an example, communications system 220 and/or speech-processing system may determine a date and time, a location of the initiating device, and/or some quality of a target contact (e.g., that the current date and time is particularly important with regards to the contact, or that there is a calendar or reminder set associated with a user account, and the calendar or reminder may further be associated with a contact).

In some embodiments, upon identifying potential contacts and determining one or more conditions, a central communications module may analyze, using one or more processors, the one or more conditions to determine an interaction rank for each contact. Communications system 220 may then determine which interaction rank is highest out of the potential target contacts. For instance, "Chris A." may correspond to the highest interaction rank. Accordingly, communications system 220 may select contact "Chris A." as the target contact, determine that device 100b is associated with "Chris A.," and establish a communications session with device 100b.

In some embodiments, communications system 220 may establish a communications session between the initiating device and the intended target device using the PSTN. As such, communications system may receive a telephone number from user accounts 268 and establish the communications session using the particular telephone number assigned to the contact. Persons of ordinary skill in the art will recognize that the systems and methods for establishing a communications system via PSTN and related networks are well known in the art and need not be discussed herein in greater detail.

In some embodiments, communications system 220 may establish a communications session between an initiating device and an intended target device using one or more VoIP protocols including, but not limited to SIP, RTP, RTCP, SRTP, and SDP. In one illustrative embodiment, a media system provides a SIP signaling command to communications system 220 for communicating with the media system of the intended target device. In particular, PJSIP functionality adds a new "user-to-user" head that indicates the device pair for the communications session. The recipient device receives a request to start the communications session with the initiating device, and checks to see whether or not that initiating device is authorized to establish communications sessions therewith. If not, then the recipient device's media system may generate and send an instruction to communications system 220 that causes the communications session to end. Typically this step would not occur as the initiating device may also check, prior to the recipient device receiving the request, to see if he/she is authorized to establish a communications session, however in some embodiments the check may be performed by both endpoints. The results of this step may, in addition to the other conditions described herein, be used to calculate or otherwise determine an interaction rank, and/or be stored in memory for later use.

If the initiating device determines that the recipient device is authorized to establish communications session therewith, then the media system of the recipient device may send an accept call command to communications system 220, indicating that the communications session may begin. In response to receiving the accept call command, communications system 220 may send a 200 (OK) message to a SIP Proxy running on communications system 220 for facilitating the communications session. A 200 (OK) is a standard response that indicates a successful HTTP request. The SIP Proxy may act as an intermediary server/client for making requests for both the initiating device and the recipient device for routing communications to/from either device. After receiving the 200 (OK) message, the SIP Proxy may send another 200 (OK) message to the initiating device, which may acknowledges receipt using an ACK (e.g., an acknowledgement). In turn, a SIP Dialog may be established by communications system 220 for the communications session, and media systems of both the initiating device and the recipient device may connect to the SIP Dialog, and the two devices may now communicate with one another.

It may also be recognized that although each of communications account system 222, preferences system 224, communications routing system 226, and contact services system 228 may each include instances of processor(s) 252, storage/memory 254, and communications circuitry 256, and those instances of processor(s) 252, storage/memory 254, and communications circuitry 256 within each of communications account system 222, preferences system 224, communications routing system 226, and contact services system 228 may differ.

FIG. 3 is an illustrative diagram of an exemplary system architecture of various components of contact resolution system 232 of FIG. 2, in accordance with various embodiments. As stated above, contact resolution system 232 may include IR database 322, IR resolution system 324, interactions database 326, and central disambiguation unit 328.

In some embodiments, IR database 322 may store previously determined interaction ranks. For instance, based on historical data representing, among other things, previous communications sessions, interaction ranks previously determined under various specific conditions may be stored so that, rather than determine a new interaction rank under the same conditions each time substantially intent data must be processed, an appropriate interaction rank may quickly be accessed.

In some embodiments, IR resolution system 324 may be configured to receive interaction data stored in interactions database 326 and, using that interaction data, calculate interaction ranks. Interaction data may include, for instance, historical data representing intent data corresponding to previous communications sessions, which may include historical data representing conditions determined while establishing those communications sessions.

In some embodiments, central disambiguation unit 328 may coordinate with other components of communications system 220. For instance, central disambiguation unit 328 may include communications circuitry for sending and receiving data to and from orchestrator 205 and other electronic devices, as well as one or more processors for interacting with the various components of communications system 220. In some embodiments, for example, upon receiving intent data corresponding to an intent to communicate with a contact from orchestrator 205 and/or contact information from contact database 238, central disambiguation unit 328 may interact with IR resolution system 324 using a condition received with intent data to determine an interaction rank. In some embodiments, an interaction rank may have already been determined and associated with the condition received with the intent data. Accordingly, in some embodiments, an interaction rank already stored in IR database and associated with a particular contact may be retrieved. This may be performed for as many contacts that are associated with a stored interaction rank. This may help to reduce latency by removing a need to calculate interaction rank each time intent data is received. As such, central disambiguation unit 328 may receive the appropriate interaction ranks from IR resolution system 324 and forward that information to orchestrator 205. IR database 322 may include memory for storing interaction ranks. Alternatively, IR database 322 may be housed in storage/memory 254 of contact resolution system 232. Additionally, IR database may include communications circuitry for communicating with central disambiguation unit 328.

In some embodiments, it may be necessary to calculate interaction rank. Accordingly, IR resolution system 324 may receive interactions data representing prior intent data corresponding to previous communications sessions and other information. IR resolution system may receive the interactions data from interactions database 326 and utilize the interactions data in order to determine an interaction rank. For instance, an interaction rank may be determined ad hoc by receiving one or more conditions with intent data and contact information received from orchestrator 205 and contact database 238, respectively. Along with the one or more conditions, prior interactions data stored in memory, specifically interactions database 326, may be retrieved to determine, based on historical data, whether any correlation exists between the one or more conditions and the prior interactions data.

IR resolution system 324 may include one or more processors operable to calculate an interaction rank based on the various sources and types of data described herein. Additionally, IR resolution may communicate directly with interactions database 326 to retrieve interactions data. IR resolution system 324 may also include communications circuitry for communicating with central communications module 226.

The system of FIG. 3 may exist external to contact resolution system 232 as a separate component of communications system 220. Alternatively, the system of FIG. 3 may exist in various components of contact resolution system 232 or of communications system 220. For instance, IR database 322 and interactions database 326 may be stored in storage/memory 254, the functions of IR resolution 324 may be performed by processor(s) 252, or by a separate, dedicated processor within contact resolution system 232 according to rules stored in disambiguation rules 236 (within memory 254 as shown in FIG. 2). Similarly, the functions of central disambiguation unit 328 may be configured in processor(s) 252 or as a separate, dedicated processor within contact resolution system 232.

Figure 4:
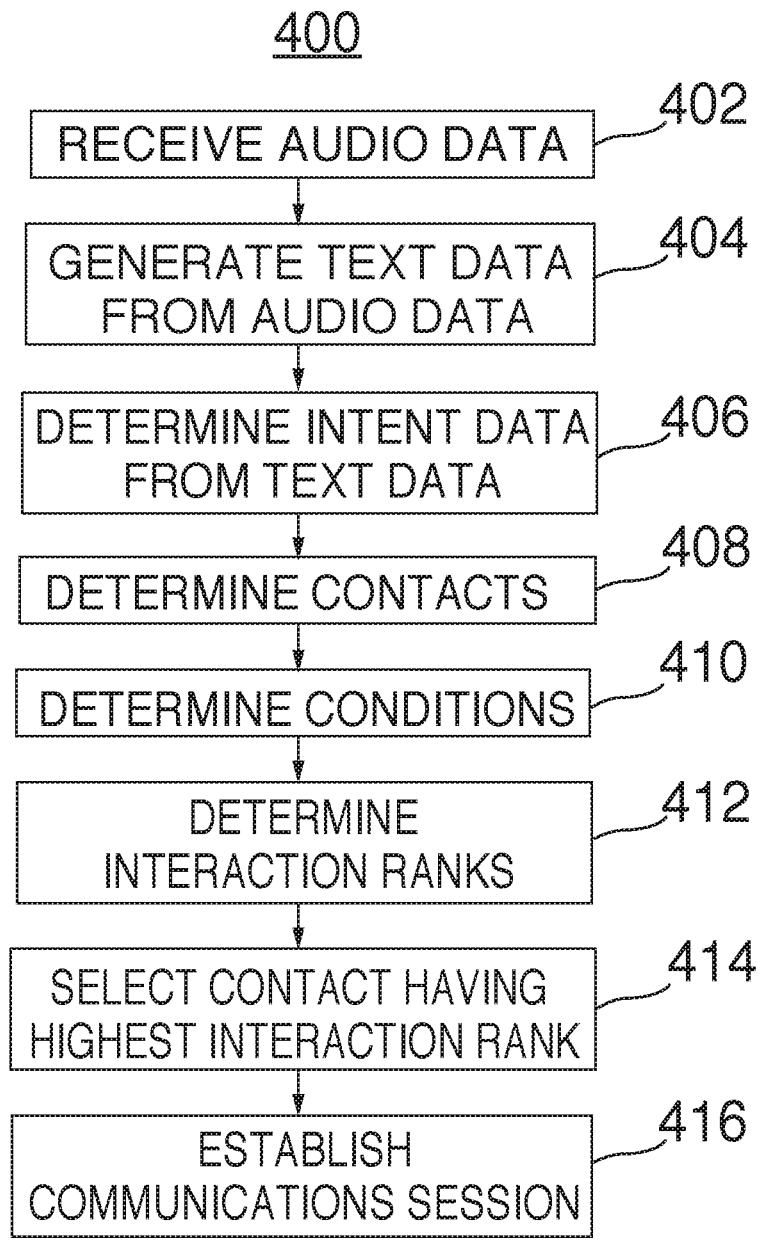
FIG. 4 is a process for establishing a communications session between an initiating device and a target device, in accordance with various embodiments.

FIG. 4 is a process for establishing a communications session between an initiating device and a target device, in accordance with various embodiments. Process 400, in various embodiments, may begin at step 402. At step 402, audio data representing spoken words may be received from an initiating device. Step 402 may occur first by the initiating device receiving an audio signal spoken by a user (e.g., utterance 4 spoken by individual 1) using one or more microphones included in the initiating device. The audio signal may be converted by the initiating device into a digital audio data file that includes representations of the received audio signal. The audio data may then be received by a system, such as computing system 200, which may send the audio data to orchestrator 205 for further processing. At step 404, using ASR processing, orchestrator 205 may generate text data representing the text data. The text data may further be processed at step 406.

At step 406, intent data may be determined from the text data. For instance, once the text data is generated using ASR processing, NLU processing may be employed to determine intent data. Intent data may include varieties of information. For instance, intent data may include an intent to communicate, as well as an intended target of the communication. Additionally, intent data may include a contact name slot to be resolved. As stated above, the contact name slot may be resolved by determining a contact identifier as a value matching the contact name slot such that the contact identifier may be used for resolving the contact name slot. Further, intent data may include one or more conditions involving the utterance. For instance, computing system 200 may receive information from user accounts 268, as well as speechlet 262. Information from speechlet 262 may include, but not be limited to clocks, calendars, local databases, and a global positioning system, among other information.

At step 408, a list of contacts associated with the user device may be determined. For instance, a list of contacts may be received from user accounts 268. Included with the list of contacts may be information that may be used to generate or otherwise determine an interaction rank. Information relating to the contacts may include, but not be limited to names, user accounts, dates of birth, devices belonging to user accounts, locations, associations to any calendar entries, and communications history. Based on the information relating to the contacts, various entries in the contacts list may be assessed in order to determine which contact identifier associated with those entries is the best value to resolve the contact name slot.

Based on the intent data received and the contacts associated with the user device, one or more conditions may be determined at step 410. For instance, a condition may be based on information relating to a contact (e.g., data relating to prior interactions between the user account and the contact), location data representing a location in which the utterance is spoken, time data representing a day of a week and/or a time of day, an amount of mutual contacts between the user account and each contact, etc.

At step 412, an interaction rank may be determined for each contact. An interaction rank may be employed to assess context-specific relationships between a user account and a contact. An interaction rank may be a value assigned to a particular contact as an assessment of the strength of the relationship between a user and the particular contact. For instance, contacts that most frequently communicate with a user may be assigned relatively high interaction ranks, while contacts who least frequently communicate with the user may be assigned relatively low interaction ranks. Interaction ranks may be context-specific. For instance, various sets of conditions may be categorized and contacts may be assigned different interaction ranks for each set of conditions. An interaction rank may be determined using any variable, metric, or source of information, including, but not limited to: intent data, conditions, other interaction ranks, and interactions data, among others.

Specifically, an interaction rank may represent a "strength" of interaction between two communications identifiers (e.g., a particular user account and a contact). Each communication between two communications identifiers adds a certain value to an interaction rank between those two communications identifiers. For instance, an interaction rank may be scored at a scale of 0 to 100 units. Each communication initiated by a user to a contact may increase an interaction rank assigned to the contact by a value of "20" units, while each communication initiated by the contact to the user may increase the interaction rank by a value of "10" units.

Over time, a rate of degradation may be applied to the interaction rank. Continuing the example in the preceding paragraph, the interaction rank may reduce over time in accordance with a degradation rate of, for instance, 0.2 units per day. As another example, a first interaction rank assigned to a first contact who interacts with a user on a daily basis may be a value of 96 units, while a second interaction rank assigned to a second contact who merely interacts with the user on a monthly basis may be a value of 34 units.

Interaction ranks may be valued in a human readable form, or in a more complicated form that may more clearly indicate consideration of the variety of variables that may be used to calculate an interaction rank. For instance, a normalized (i.e., human readable) interaction rank may allow for a clear mapping between a value of an interaction rank and the frequency of interactions between two people. By providing a mapping of interaction ranks, further recalculation of interaction ranks may be more readily developed. Additionally, by providing easily readable interaction ranks, a strength of a relationship between a user and a contact may be more easily determined.

At step 414, a contact having a highest interaction rank may be selected. For instance, a first contact identifier may be assigned a first interaction rank and a second contact identifier may be assigned a second interaction rank. If it is determined that the first interaction rank is higher than the second interaction rank, then the contact identifier that is assigned the first interaction rank (i.e., the first contact identifier) may be selected as a value for resolving the contact name slot. Finally, at step 416, a communications session may be established between the initiating device and a device associated with the selected contact.

In some embodiments, more than one contact may have the highest interaction rank. For instance, two contacts may have a substantially equivalent strength of relationship based on a given condition or set of conditions. As such, further disambiguation may be necessary. In some embodiments, this may be performed by generating output data representing a request for a selection between the contacts having the highest interaction rank. Based on the output data, audio, text, or other visual data may be generated that represents the output data. For instance, audio data may be generated and sent to the initiating device for presentation such that the initiating device outputs an audio signal, such as "Which contact would you like to call?" As another example, an image may be generated in alternative or addition to the audio data such that one or more images and/or text representing the potential contacts may be displayed on a display screen of the initiating device.

In some embodiments, a selected contact may include one or more devices. As such, interaction ranks may apply not only to contact, but devices as well. For instance, once a contact is selected, if it is determined that multiple electronic devices belong to the contact, output data may be generated, such that the output data represents a request for a selection between devices. Additionally, in other embodiments, interaction ranks may be associated with the devices. For instance, based on a condition being a time of day and day of the week, a first device may have a higher interaction rank than a second device. For instance, an additional condition may relate to information received from user accounts 268 regarding the contact. As an example, usage data may indicate that the user more likely to be available at the first device at a particular time and day. Accordingly, if the determined condition correlates with the usage data, then the first device may have a considerably higher interaction rank than the second device. Conversely, if usage data indicates that the user is usually available at the second device at a different time and day, and the intent data indicates that the intent to communicate with the contact is at the different time and day, then the second device may have a higher interaction rank under these conditions.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method comprising:
receiving, from an initiating device, first input audio data;
identifying a user account associated with the initiating device;
performing speech processing using the first input audio data to obtain:
intent data representing a desire to communicate with a contact name, and
slot data representing the contact name slot to be resolved;
accessing a contact list associated with the user account;
determining, based on the contact list, a first contact identifier associated with the contact name;
determining, based on the contact list, a second contact identifier associated with the contact name;
determining a first group of contact identifiers associated with the first contact identifier;
determining a second group of contact identifiers associated with the second contact identifier;
determining a first condition associated with receiving the first input audio data;
determining, based on the first condition and the first contact identifier being associated with the first group, a first interaction rank assigned to the first contact identifier;
determining, based on the first condition and the second contact identifier being associated with the second group, a second interaction rank assigned to the second contact identifier;
determining that the first interaction rank is higher than the second interaction rank;
selecting, based on the first interaction rank and the second interaction rank, the first contact identifier as a value for resolving the contact name slot; and
establishing, based on the first contact identifier, a first communications session with the initiating device and a target device, wherein the target device is associated with the first contact identifier.

2. The method of claim 1, further comprising:
determining, based on the contact list, a third contact identifier associated with the contact name;
determining, using the first condition, a third interaction rank, wherein the third interaction rank is assigned to the third contact identifier;
determining that the first interaction rank is substantially equal to the third interaction rank;
generating output audio data representing a request for a selection;
sending the output audio data to the initiating device;
receiving, from the initiating device, second input audio;
determining, using the second input audio data, the selection of the first identifier at a specific hour;
determining a second condition; and
generating, based at least in part on the intent data, a fourth interaction rank, wherein the fourth interaction rank is based on the first interaction rank, the intent data, and the second condition, and wherein the fourth interaction rank is assigned to the first contact identifier and is based on the second condition.

3. The method of claim 2, further comprising:
determining a third device associated with the first contact identifier;
receiving, while establishing the first communications session, second audio data from the initiating device;
determining that the second audio data represents a request to cancel establishing the first communications session;
canceling establishing the first communications session; and
establishing, in response to canceling establishing the first communications session, a second communications session between the initiating device and the third device.

4. The method of claim 1, further comprising:
generating interaction data comprising the intent data and information regarding the first condition, the first contact, and the first communications session; and
storing the interaction data in memory;
generating, using the interaction data, a third interaction rank; and
replacing the first interaction rank with the third interaction rank as being assigned to the first contact identifier.

5. A method comprising:
receiving, from a first device, first input data;
identifying a user account associated with the first device;
determining intent data from the first input data;
determining that the first input data corresponds to an intent to communicate with a contact represented by a contact name, the intent data associated with a contact name slot to be resolved;
accessing a contact list associated with the user account;

determining, based on the contact list and the contact name, a first contact identifier and a second contact identifier;

determining a first group of contact identifiers associated with the first contact identifier;

determining a second group of contact identifiers associated with second contact identifier;

determining, a first condition associated with receiving the first input data;

determining, based on the first condition and the first contact identifier being associated with the first group, a first interaction rank associated with the first contact identifier;

determining, based on the first condition and the second contact identifier being associated with the second group, a second interaction rank associated with the second contact identifier;

selecting, based on a comparison between the first interaction rank and the second interaction rank, the first contact identifier as a value for resolving the contact name slot;

determining a second device associated with the first contact identifier; and sending a first communication from the first device to the second device.

6. The method of claim 5, wherein selecting the first contact identifier further comprises:

determining that the first interaction rank is equivalent to the second interaction rank;

generating output data representing a request for a selection between the first contact identifier and the second contact identifier; and sending the output data to the first device for presentation.

7. The method of claim 6, further comprising:

receiving, after sending the output data to the first device, second input data representing the selection of the first contact identifier;

determining a second condition associated with receiving the second input data; and generating a third interaction rank based, at least in part, on the first interaction rank, the intent data, the first condition, and the second condition, wherein the third interaction rank is associated with the first contact identifier.

8. The method of claim 6, wherein the first device comprises a display screen, wherein a first contact image corresponds to the first contact identifier and a second contact image corresponds to the second contact identifier, the method further comprising:

displaying the first contact image and the second contact image on the display screen.

9. The method of claim 5, further comprising:

generating interaction data comprising the intent data and information regarding the first condition, the first contact identifier, and the first communication; and storing the interaction data in memory;

generating, using the interaction data, a third interaction rank; and replacing the first interaction rank with the third interaction rank as being associated with the first contact identifier.

10. The method of claim 9, further comprising:

determining a third device associated with the first contact identifier;

receiving, while sending the first communication, second input data from the first device;

determining that the second input data represents a request to cancel sending the first communication;

canceling sending the first communication; and sending, in response to canceling sending the first communication, a second communication from the first device to the third device.

11. The method of claim 10, further comprising:

determining a second condition associated with receiving the second input data;

generating the second interaction rank based, at least in part, on the first interaction rank, the intent data, the first condition, and the second condition, wherein the second interaction rank is associated with the second device; and generating the third interaction rank based, at least in part, on the first interaction rank, the intent data, the first condition, and the second condition, wherein the third interaction rank is associated with the third device.

12. A system comprising:

communications circuitry;

memory; and a processor operable to:

receive, from a first device, first input data;

identify a user account associated with the first device;

determine intent data from the first input data;

determine, that the first input data corresponds to an intent to communicate with a contact represented by a contact name, the intent data associated with a contact name slot to be resolved;

access, a contact list associated with the user account;

determine, based on the contact list, and the contact name, a first contact identifier and a second contact identifier;

determine a first group of contact identifiers associated with the first contact identifier;

determine a second group of contact identifiers associated with second contact identifier;

determine, a first condition associated with receiving the first input data;

determine, based on the first condition and the first contact identifier being associated with the first group, a first interaction rank associated with the first contact identifier;

determine, based on the first condition and the second contact identifier being associated with the second group, a second interaction rank associated with the second contact identifier;

select, based on a comparison between the first interaction rank and the second interaction rank, the first contact identifier as a value for resolving the contact name slot;

determine a second device associated with the first contact identifier; and send a first communication from the first device to the second device.

13. The system of claim 12, wherein selecting the first contact identifier further comprises:

determining that the first interaction rank is equivalent to the second interaction rank;

generating output data representing a request for a selection between the first contact identifier and the second contact identifier; and sending the output data to the first device for presentation.

14. The system of claim 13, wherein the processor is further operable to:

receive, after sending the output data to the first device, second input data representing the selection of the first contact identifier;

determine a second condition associated with receiving the second input data; and generate a third interaction rank based, at least in part, on the first interaction rank, the intent data, the first condition, and the second condition, wherein the third interaction rank is associated with the first contact identifier.

15. The system of claim 13, wherein the first device comprises a display screen, wherein a first contact image corresponds to the first contact identifier and a second contact image corresponds to the second contact identifier, wherein the processor is further operable to:

displaying the first contact image and the second contact image on the display screen.

16. The system of claim 12, wherein the processor is further operable to:

generate interaction data comprising the intent data and information regarding the first condition, the first contact identifier, and the first communication; and store the interaction data in memory;

generate, using the interaction data, a third interaction rank; and replace the first interaction rank with the third interaction rank as being associated with the first contact identifier.

17. The system of claim 16, wherein the processor is further operable to:

determine a third device associated with the first contact identifier;

receive, while sending the first communication, second input data from the first device;

determine that the second input data represents a request to cancel sending the first communication;

cancel sending the first communication; and send, in response to canceling sending the first communication, a second communication from the first device to the third device.

18. The system of claim 17, wherein the processor is further operable to:

determine a second condition associated with receiving the second input data;

generate the second interaction rank based, at least in part, on the first interaction rank, the intent data, the first condition, and the second condition, wherein the second interaction rank is associated with the second device; and generate the third interaction rank based, at least in part, on the first interaction rank, the intent data, the first condition, and the second condition, wherein the third interaction rank is associated with the third device.

* * * * *